US008334605B2

(12) United States Patent
Catinella

(10) Patent No.: US 8,334,605 B2
(45) Date of Patent: Dec. 18, 2012

(54) FLOATING MECHANICAL STRUCTURE TO PRODUCE DIRECTLY ELECTRICITY BY MEANS OF THE SWINGING OF A MAGNETIC PENDULUM CAUSED BY SEA WAVE MOTION

(76) Inventor: Vito Antonio Catinella, Modugnu (IT)

( * ) Notice: Subject to any disclaimer, the term of this patent is extended or adjusted under 35 U.S.C. 154(b) by 381 days.

(21) Appl. No.: 12/669,931

(22) PCT Filed: Jul. 20, 2007

(86) PCT No.: PCT/IT2007/000516
§ 371 (c)(1),
(2), (4) Date: Jun. 29, 2010

(87) PCT Pub. No.: WO2009/013766
PCT Pub. Date: Jan. 29, 2009

(65) Prior Publication Data
US 2010/0264657 A1 Oct. 21, 2010

(51) Int. Cl.
*F03B 13/10* (2006.01)
*F03B 13/12* (2006.01)
*H02P 9/04* (2006.01)
*F03B 13/00* (2006.01)

(52) U.S. Cl. ............................. 290/42; 290/53; 290/54
(58) Field of Classification Search ............ 290/42, 290/53, 54
See application file for complete search history.

(56) References Cited

U.S. PATENT DOCUMENTS

| 851,549 | A | * | 4/1907 | Neal | 417/211 |
|---|---|---|---|---|---|
| 3,231,749 | A | * | 1/1966 | Hinck, III | 290/53 |
| 3,696,251 | A | | 10/1972 | Last et al. | 290/53 |
| 4,317,047 | A | * | 2/1982 | de Almada | 290/53 |
| 4,423,334 | A | * | 12/1983 | Jacobi et al. | 290/53 |
| 4,476,397 | A | * | 10/1984 | Lawson | 290/54 |
| 4,608,497 | A | * | 8/1986 | Boyce | 290/53 |
| 4,748,338 | A | * | 5/1988 | Boyce | 290/42 |
| 6,294,844 | B1 | * | 9/2001 | Lagerwey | 290/55 |
| 6,647,716 | B2 | * | 11/2003 | Boyd | 60/398 |
| 7,105,939 | B2 | * | 9/2006 | Bednyak | 290/42 |
| 7,239,038 | B1 | * | 7/2007 | Zimmerman et al. | 290/54 |
| 7,352,073 | B2 | * | 4/2008 | Ames | 290/42 |
| 7,538,445 | B2 | * | 5/2009 | Kornbluh et al. | 290/53 |
| 7,557,456 | B2 | * | 7/2009 | Kornbluh et al. | 290/42 |
| 7,649,276 | B2 | * | 1/2010 | Kornbluh et al. | 290/53 |
| 7,989,975 | B2 | * | 8/2011 | Clement et al. | 290/53 |
| 8,026,620 | B2 | * | 9/2011 | Hobdy | 290/42 |
| 8,067,849 | B2 | * | 11/2011 | Stewart | 290/53 |
| 8,102,065 | B2 | * | 1/2012 | Hobdy | 290/1 R |
| 8,198,745 | B2 | * | 6/2012 | Laz et al. | 290/53 |
| 2002/0157398 | A1 | * | 10/2002 | Boyd | 60/721 |
| 2009/0008942 | A1 | * | 1/2009 | Clement et al. | 290/53 |
| 2010/0032946 | A1 | * | 2/2010 | Begley et al. | 290/3 |
| 2010/0123313 | A1 | * | 5/2010 | Hobdy | 290/42 |
| 2011/0042949 | A1 | * | 2/2011 | Laz et al. | 290/42 |
| 2011/0285128 | A1 | * | 11/2011 | Hobdy | 290/42 |
| 2012/0080883 | A1 | * | 4/2012 | Hobdy | 290/53 |

* cited by examiner

FOREIGN PATENT DOCUMENTS

| SU | 587570 | 1/1978 |
|---|---|---|
| WO | 02061277 | 8/2002 |
| WO | 2006040341 | 4/2006 |

*Primary Examiner* — Pedro J Cuevas
(74) *Attorney, Agent, or Firm* — Egbert Law Offices, PLLC

(57) ABSTRACT

The invention refers to a floating mechanical structure suitable for realizing a mega-plant for generating electrical energy, by exploiting the relative motion of a large number of electromagnets mounted on a floating structure, with respect to a multiple number of permanent magnets incorporated in a pendulum suspended from the top of a trestle acting by magnetic induction on the electromagnets; the swings are provoked by wave action.

17 Claims, 8 Drawing Sheets

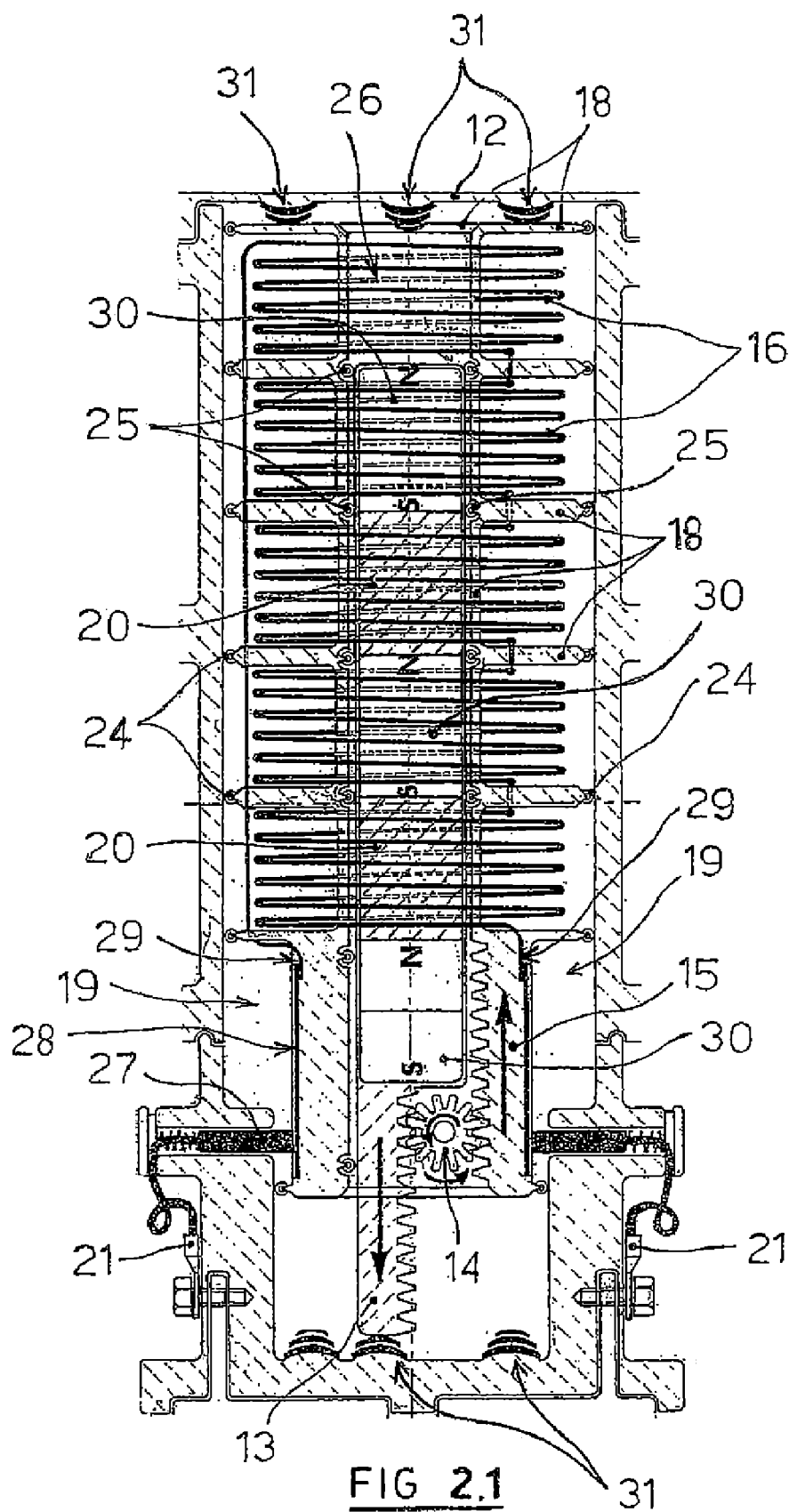
FIG 2.1

FLOATING MECHANICAL STRUCTURE TO PRODUCE DIRECTLY ELECTRICITY BY MEANS OF THE SWINGING OF A MAGNETIC PENDULUM CAUSED BY SEA WAVE MOTION

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention refers to a floating mechanical structure suitable for realizing mega electrical energy generating plants, by exploiting the relative motion of a large number of electromagnets, installed on a floating structure, with respect to a multiple number of permanent magnets incorporated in a pendulum suspended from the top of a trestle and acting on the electromagnets by magnetic induction: the swings are induced by wavemotion.

2. Description of Related Art Including Information Disclosed Under 37 CFR 1.97 and 37 CFR 1.98

The state of the art comprises numerous floating devices that exploit wave motion for generating electricity by magnetic pendulums swinging with respect to suitable circuits mounted on floating means We are mentioning a few reference patents, in this order:

U.S. Pat. No. 4,317,047 by the title "Energy Harnessing Apparatus" filed on 31 Dec. 1979, constituted of a structure mounted on a floating body that swings as a result of the motion transmitted by wave motion.

U.S. Pat. No. 3,691,573 filed on 27 Jul. 1970 by the title "Self-Powered Signal Buoy" referring to a signal buoy fitted with pendulums based on the production of compressed air.

U.S. Pat. No. 4,851,704, filed on 17 Oct. 1988 by the title "Wave Action Electricity Generation System and Method", referring to an electrical energy generating plant mounted on a floating platform and exploiting the swings of wave motion.

U.S. Pat. No. 4,340,821 filed on 19 Jun. 1980 by the title "Apparatus and Harnessing Wave Energy", consisting in the exploitation of wave motion for generating electrical energy.

Patent JP 57075559 filed on 28 Dec. 1980 by the title "Pendulum Type Polarized Generator Using Surface Water Power as Driving Source", comprising a pendulum swinging as a result of wave motion.

Patent application PCT WO 01/061277 of 29 Jan. 2001by the title "Pendulum Generator", based on a plant converting the mechanical energy generated by a pendulum into electrical energy.

U.S. Pat. No. 4,423,334 of 28 Sep. 1979 by the title "Wave Motion Electric Generator", consisting of a buoy equipped with a pendulum and other devices suitable for generating electrical energy.

Patent US 2004/0179958 of 22 April 2007 by the title "Pendulum Type Power Generator", consisting in a device generating compressed air: the mechanical energy is subsequently converted into electrical energy.

Patent US 2002/0157398 of 4 Jun. 2001 by the title "Ocean Wave Power Generator (A Modular Power-Producing Network)."

Patent JP 2005/280601 of 30 Mar. 2004 by the title "Electric Power Steering Device".

U.S. Pat. No. 3,988,592 of 14 Nov. 1974 by the title "Electrical Generating System", referring to a system for generating electricity constituted of a floating plastic sphere anchored to the sea floor. A generator based on wind action is mounted on top of the sphere for generating electricity, and a compressor is mounted below the sphere for generating electricity from the wave motion.

U.S. Pat. No. 4,249,084 of 24 Jul. 1978 by the title "Scheme for Harnessing Hydro-Undulatory Power" for the purpose of converting wave power into its mechanical and electrical counterparts.

All the patents above and the following others we're quoting by their respective numbers: U.S. Pat. No. 4,379,235 of 9 Mar. 1981 by the title "Wave Action Generator".

Application PCT W099/46503 of 15 Mar. 1999 by the title "Apparatus for Converting Ocean Wave Motion to Electricity", are based on exploiting wave motion with the exception of some having the characteristics of industrial structures, such as: Patent JP-55120367 of 9 Nov. 1970 by the title "Coil for the Dynamo of a Multistage Magnetic Generator Utilizing Upward and Downward Wave Motion", Patent W02005/103485 of 26 Mar. 2004 by the title "Reciprocating Generator Wave PoweT-Buoy"; Patent JP 55160967 of 30 May 1979 by the title "Multimagnetic Electric Generator Employing Vertical Motion of Wave"; and Patent JP 5601807 of 20 Jul. 1979 by the title "Tower Generator Making Use of Vertical Motion of Wave."

The inventions described in the above patents possess at any rate the characteristics of devices produced by craftsmanship and not of large industrial plants capable of applying the use of an alternative energy source, essentially comparable with traditional hydroelectric, thermoelectric or nuclear power, toward obtaining high levels of power and a continuous production comparable to that of large conventional plants.

BRIEF SUMMARY OF THE INVENTION

The primary purpose of the present invention is therefore to provide a plant for generating electrical energy, by directly exploiting the wave motion of a power adequate for creating large industrial plants.

BRIEF DESCRIPTION OF THE SEVERAL VIEWS OF THE DRAWINGS

The invention to resolve the above problem is in the following described as a preferred form of embodiment of a mega-sized plant, with reference to the enclosed figures and diagrams, which are respectively illustrating:

FIG. 2.1 is a schematic view of the multiple coil permanent multiple magnet units and of the relative racks and engaging pinions to invert the reciprocal vertical shifts of the mentioned units.

DETAILED DESCRIPTION OF THE INVENTION

Figure 1:
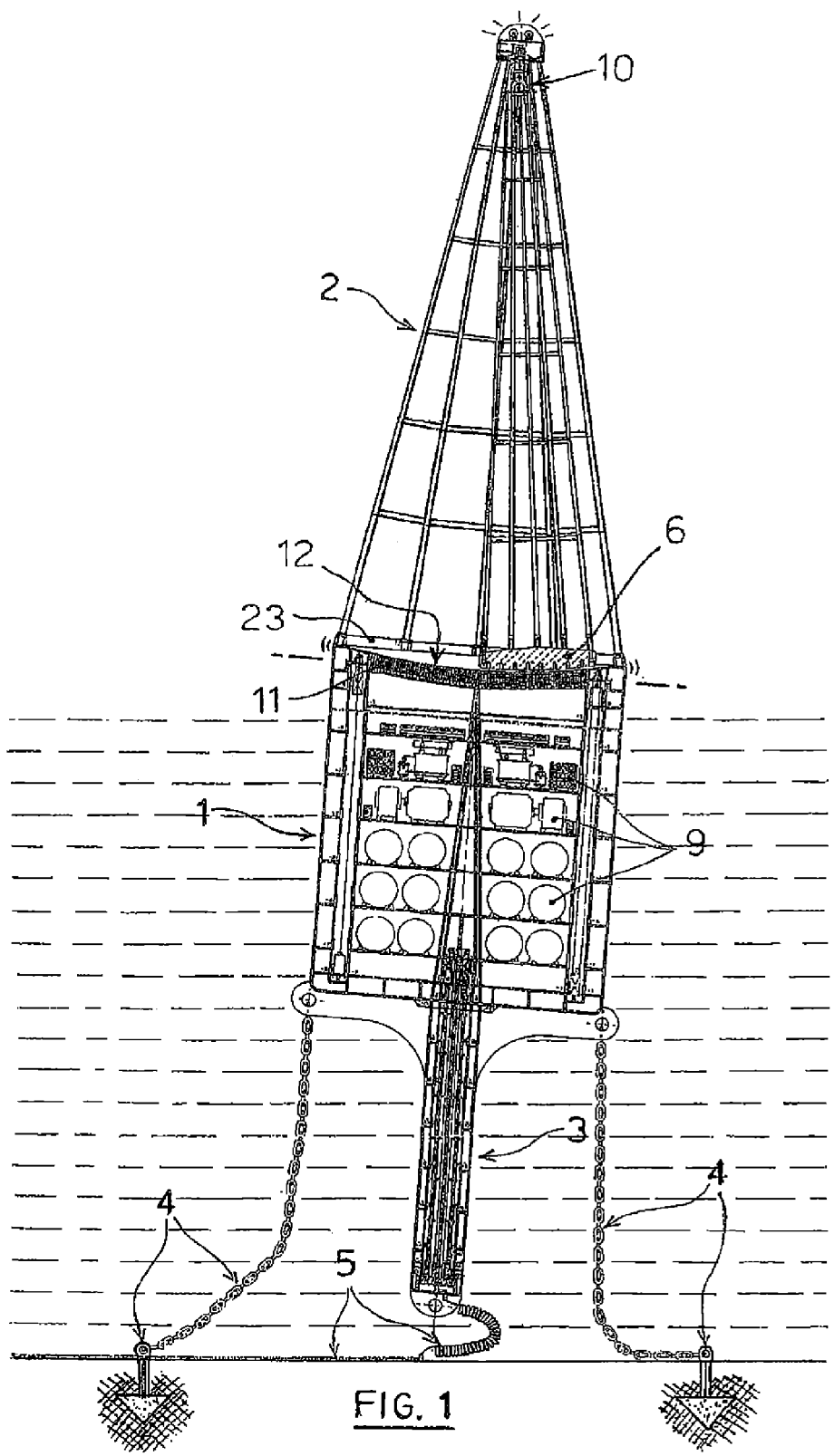
FIG. 1 a side view of an example of an electrical energy generating plant according to the invention, whose mechanical structure attains a height of 200 meters above sea level, installed on a floating body equipped at its lower end with a structure serving the purpose of lowering the centre of gravity, which is anchored to the sea floor by adequate means.

As shown in the above figures and by the respective references, the mega-generator is constituted of three fundamental parts: a floating cylindrical body 1; a trestle-like pyramidal structure 2 overhanging the cylindrical body 1 and firmly attached to the same, at whose top a disc-like pendulum 6 is suspended by a rod connected to a universal joint 10; and a cylindrical structure acting as a ballast for the entire structure, so as prevent it from overturning.

The floating cylindrical body 1 (see FIGS. 1, 2 and 2.1), whose structure is unsinkable as being provided with a double hull, is fitted at its top with a non-magnetic circular cover plate 12 connected to a series of electromagnetic devices 11 constituted of multiple coils 16 coaxial with multiple magnetic cores 17, which are composed of permanent magnets 30 capable of vertically sliding with respect to each other by means of racks 13 and 15 and pinions 14, which serve the function of allowing a doubling of, the relative shifting speed of the induction vector with respect to that of the coils' transversal conductors.

The racks 13 are firmly connected to the permanent multiple magnet units 17, while the racks 15 are firmly connected to the coaxial coils 16.

The relative motion between the magnets and the coils induces the production of electromotive forces E, according to the formula:

$$\vec{E} = \vec{B} \times 1 \times \vec{V}$$

Where B is induction produced by the permanent magnets, 1 is the length of the conductors formed by the coils, and V is the speed at which the conductors cut the magnetic force lines.

By causing the inversion of the relative motion between the coils and the magnets, the rack and pinion system produces a doubling of the tension at the ends 21 of the circuit formed by each multiple coil group 16.

The multiple coil group 16 is composed of a series of coils stacked up and supported on a hollow cylindrical skeleton 18 fitted with bearings 24 that allow it to slide within a cylindrical cavity 19.

Figure 2:
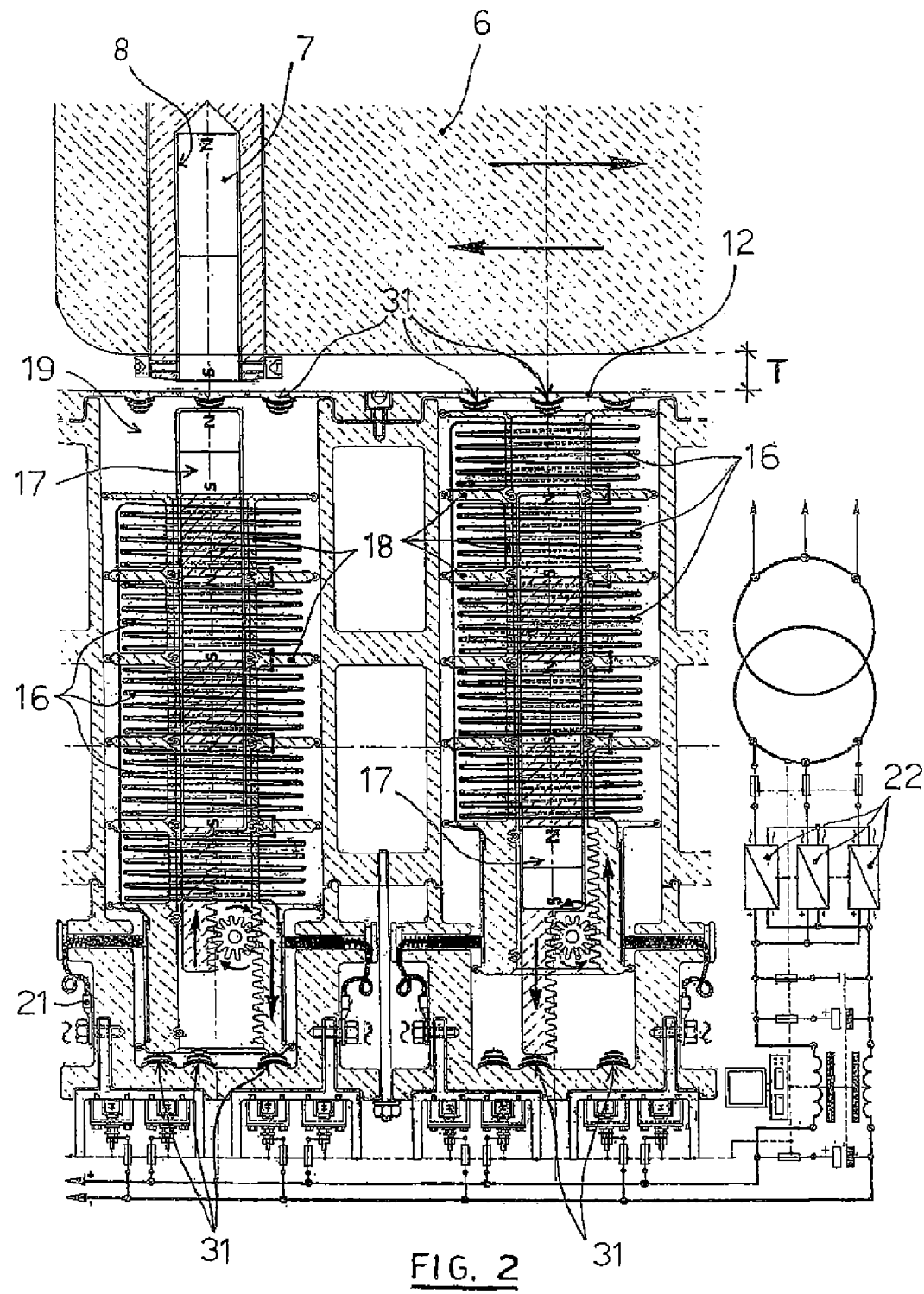
FIG. 2 is a schematic view of the multiple mobile coil units and permanent multiple magnet units with a stroke motion synchronized with the motions of the pendulum magnets, which are suspended from the top of the structure they're connected to, for the direct generation of electrical energy by the changes in the magnetic flux produced by the swings of wave action.
Figure 3:
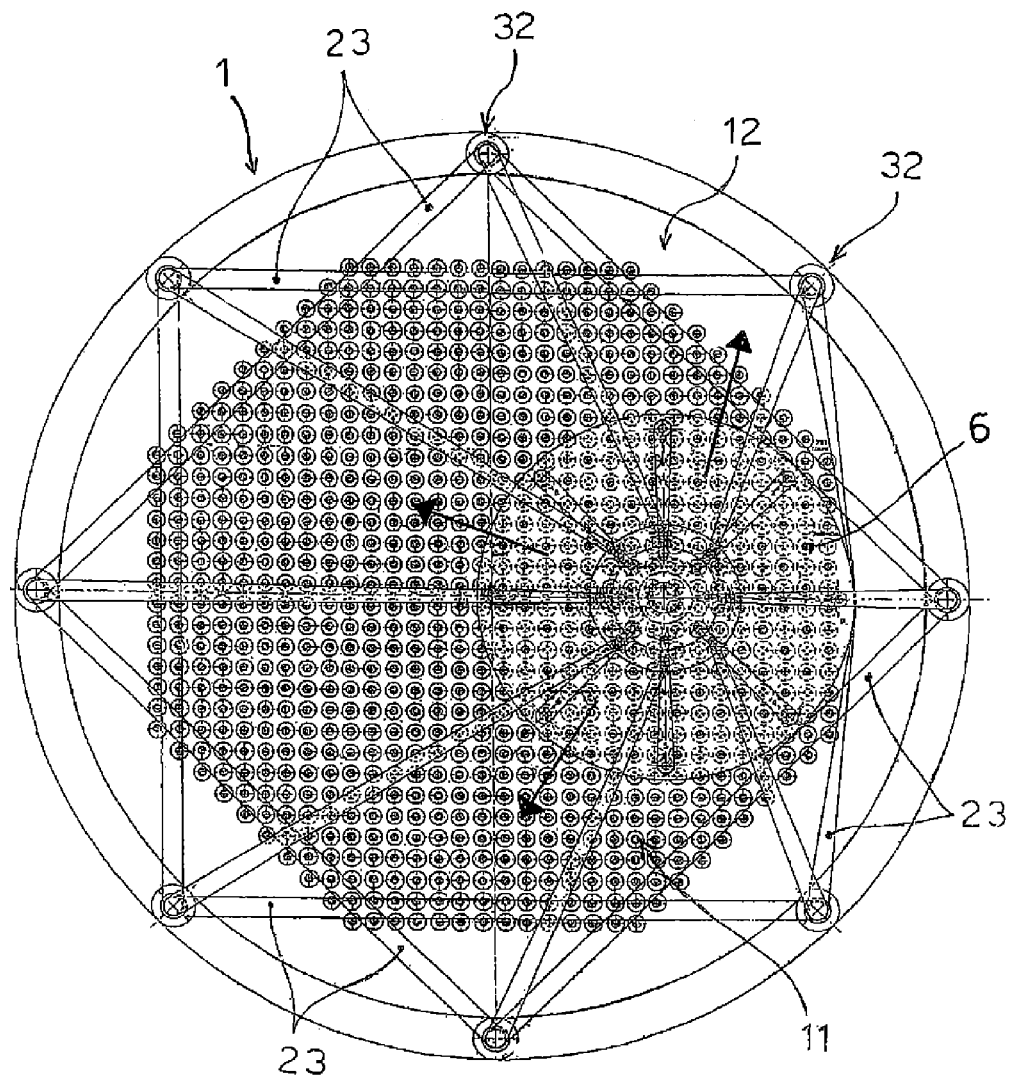
FIG. 3 a top view of the mega-generator floating body equipped- with a large number of permanent magnets and coaxial coils subjected to induction by the pendulum's permanent magnets during its swings.
Figure 4:
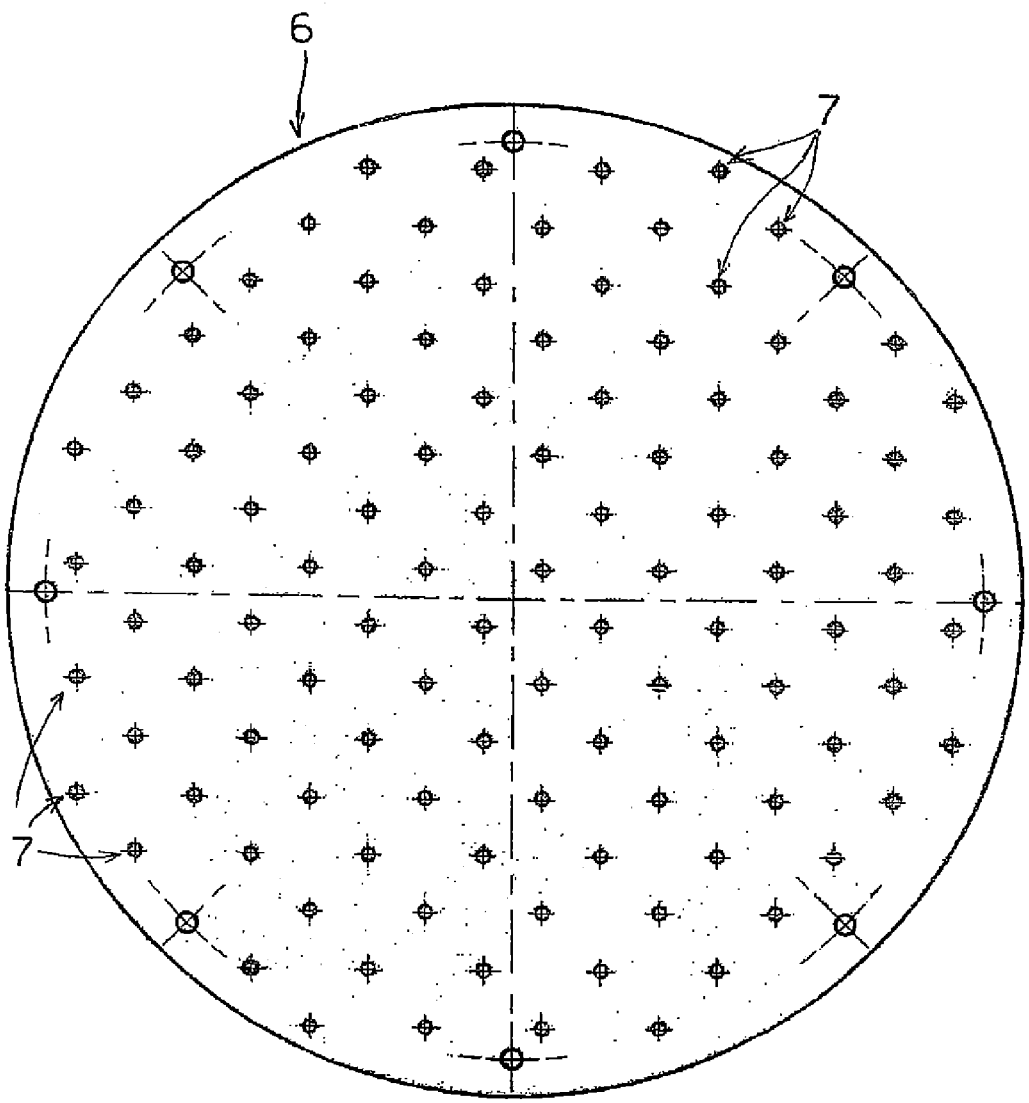
FIG. 4 a bottom view of the pendulum disc, suspended in a swinging fashion from the mega generator's floating body.
Figure 5:
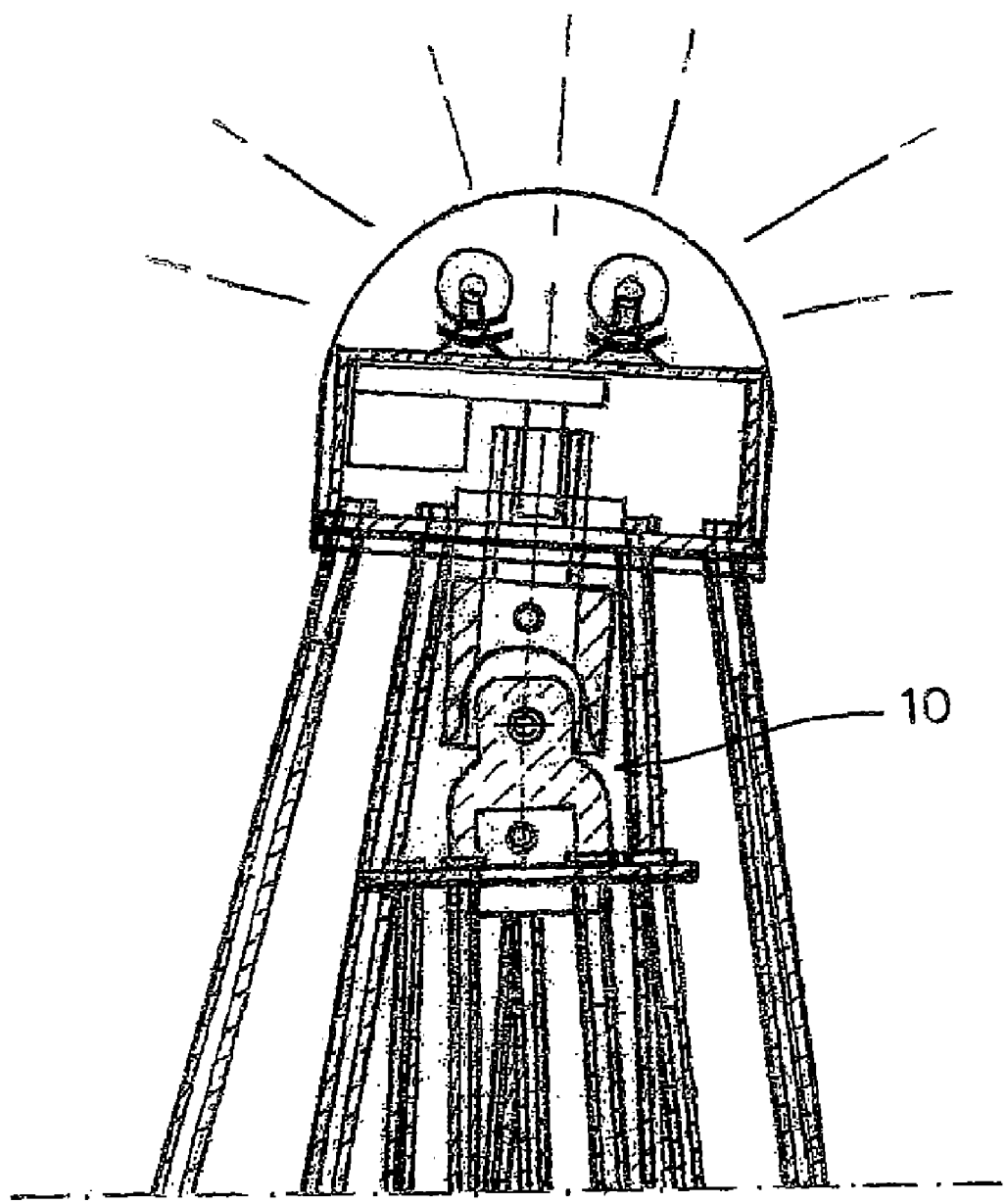
FIG. 5 is a schematic view of the universal suspension joint at the top of the mega generator structure.
Figure 6:
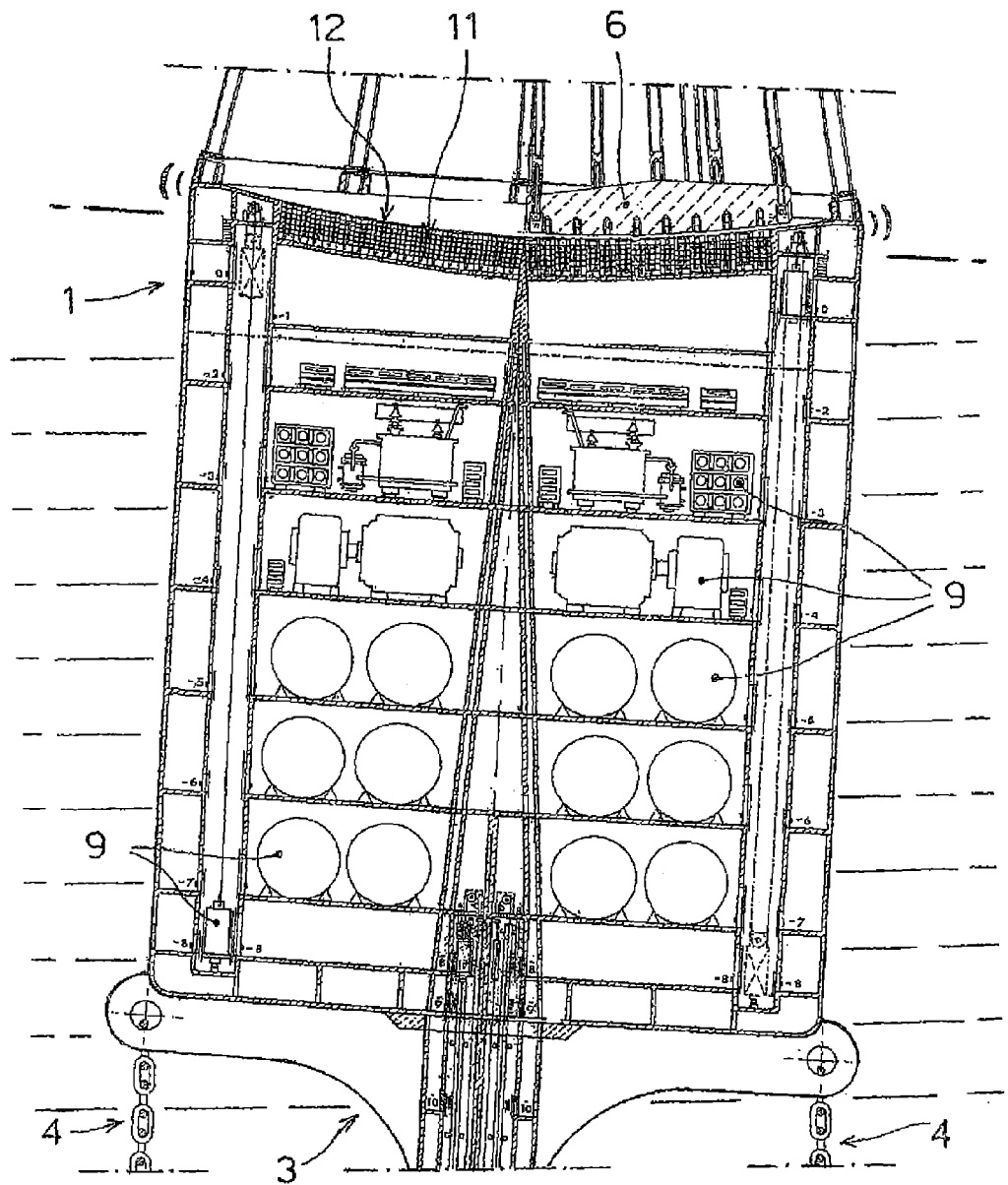
FIG. 6 is a schematic view of the plants installed inside the mega generator floating body.
Figure 7:
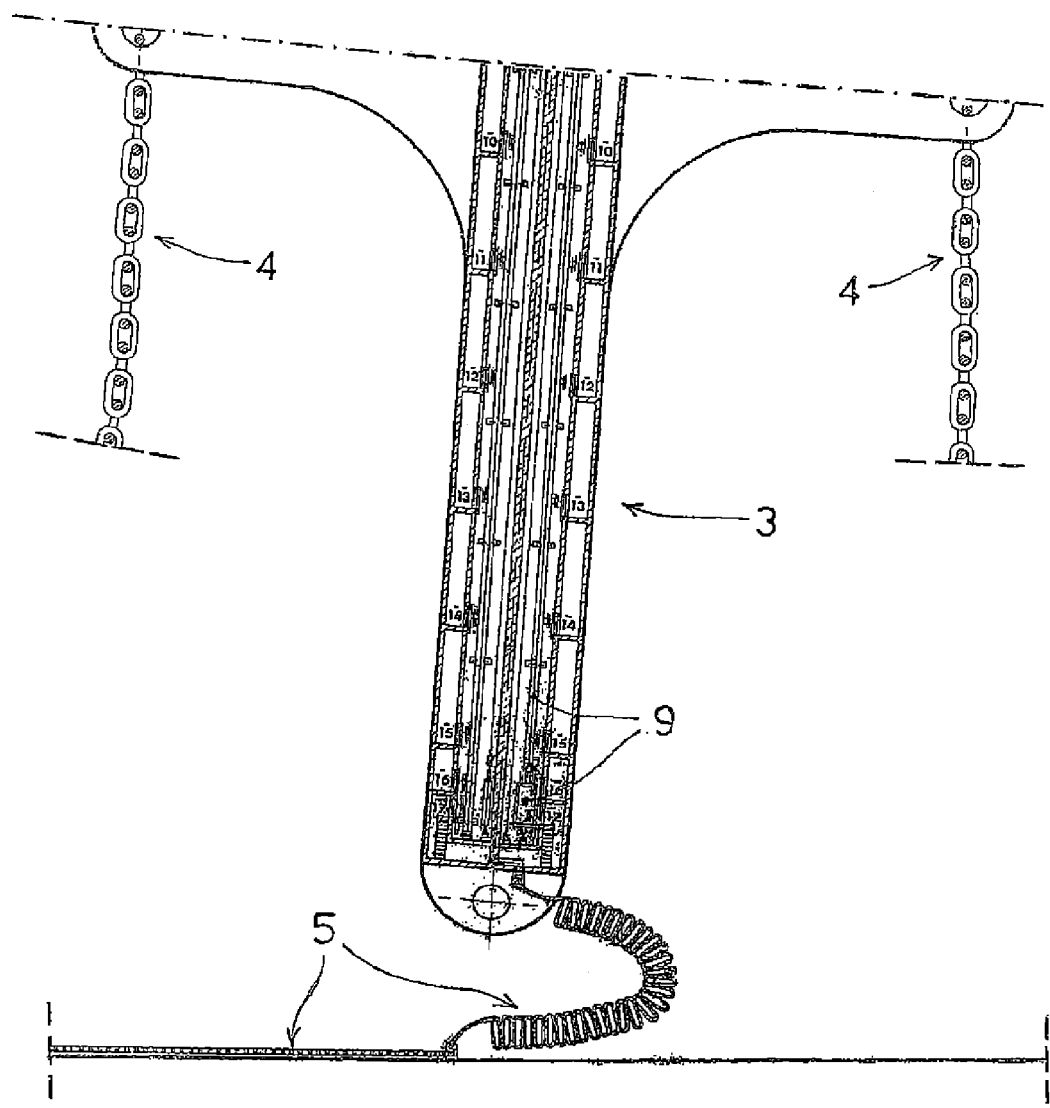
FIG. 7 is a schematic view of the structure acting as a counterweight that lowers the centre of gravity of the floating structure below the pushing centre and the relative plants installed in its interior.

In its interior, the cylindrical skeleton 18 in turns forms a cylindrical cavity 26 and is fitted with additional bearings 25 for the internal sliding motion of the multiple magnet unit 17 (see the detail of FIG. 2.1).

The permanent magnets 30 of each multiple magnet unit 17 are spaced apart by counterweights 20 made of a non-magnetic material, for instance lead, which serve the scope of boosting the reciprocal sliding speed, in a vertical sense, between each multiple coil unit and the relative multiple magnet unit.

Apart from performing the above function, the counterweights 20 are needed to overcome the magnetic induction that brakes the coils and magnets, and serve the function of separating the magnetic fields of the three permanent magnets 30.

Within each cylindrical cavity 19 containing a multiple coil unit and a multiple magnet unit, shock absorbers 31 are inserted in both the upper and lower section, which act as sliding stops for the mentioned multiple coil and multiple magnet units.

The electromotive force E generated by each multiple coil unit, picked up at the ends 21 of the circuit formed by each group, is first rectified by the four power diodes of each multiple coil unit, and all the outlets, both positive and negative, are connected in parallel with all the inlets of the power diodes of all the multiple coil units (see the diagram of FIG. 2).

The above electromotive force is then leveled and stabilized by electrolytic condensers and inductances that allow even a temporary accumulation of the energy produced, so as to compensate for the momentary voltage drops that are caused by the swings of an unsteady type in below the minimum operating intensity.

By appropriate inverters 22, the electromotive force is then converted into an alternating current feeding parallel transformers, which are in turn allowing the tension to be adapted to the specific requirements.

The picking up of the current generated by each multiple coil/multiple magnet unit is done by suitable brushes 27 sliding on appropriate collectors 28 connected to the ends 29 of each multiple coil unit 16.

The pendulum 6 is made of a non-magnetic material, for instance lead, having a weight for instance a hundred times greater than the overall weight of the permanent, high magnetic induction magnets 7 that are inserted in the multiple cylindrical cavities 8 of the pendulum 6.

The pendulum's considerable weight is needed to overcome the force of magnetic attraction between the pendulum's permanent magnets 7 and the magnets 30 of the multiple magnet units, thus eliminating the magnetic blockage induced not by the sliding action but by the attraction between the opposite poles.

Moreover, the multiple cylindrical cavities 8 of the pendulum 6 are emplaced in an alternating manner with respect to the emplacement of the multiple coil units of the nonmagnetic circular cover plate 12 of the floating cylindrical body 1, so as to allow a certain fraction of time for the inertial falling of the multiple magnet units which have been previously excited by the permanent magnets of the pendulum 6.

The reciprocal swings of the multiple coil and multiple magnet units 11, which are specifically due to wave action, induce changes in the magnetic induction needed to obtain the electromotive forces E occurring in all radial directions, so as to assure a continuity of 20 production.

For the purpose of limiting the swings of the pendulum 6 within the perimeter of the circular cover surface 12 of the floating cylindrical body 1, along the mentioned circular plate 12 a series of elastic devices 23, for instance belts, is attached to the structure of the floating body by circular supports 32.

The circular supports 32 of the elastic devices 23 also act as bases for the masts of the trestle-like pyramidal structure 2, which allows the wind to freely pass through it, so as to prevent the structure from swinging abnormally due to the force of the wind.

The lower surface of the disc-type pendulum 6 is fitted with sensors to actuate the devices attached to the universal joint 10, which allow, by retracting or releasing the pendulum supporting rod, to change the thickness of the magnetic gap T between the non-magnetic pendulum base 6 and the non-magnetic circular plate 12 of the floating body 1, so as to keep the pendulum in a safe condition, while preventing it from sliding against the series of multiple claim and multiple magnet units placed at the top of the floating cylindrical body.

In the event of for instance an expansion of the materials owing to temperature fluctuations, the thickness of the magnetic gap T is always kept constant across the subject devices, which are managed by a PLC fastened to the generator structure.

In particular, if the thickness of the magnetic gap increases even while the pendulum swings, the attraction between magnet and magnet falls and all operating ceases, while if the thickness of the magnetic gap decreases, the pendulum no longer swings and locks up by induction without any contact, as a result of the increased force of magnetic attraction between the pendulum's permanent magnets and the magnets of multiple permanent magnetic units placed at the top of the cylindrical floating body 1.

The above devices for retracting or releasing the pendulum rod, which are actuated by a motor placed at the top of the trestle-like structure, are in the event of any generator maintenance operations, such as for instance for replacing a multiple coil or a multiple magnet unit, a sprocket etc., also allowing them to change the thickness of the magnetic gap T up to its maximum, and eventually to block the rod of the disc-type pendulum 6 by using four electromagnetic magnets mounted on the universal joint 10.

Inside the floating cylindrical body 1 of the mega-installation that exemplifies the present invention, machines, devices and plants 9 may be installed for maintaining the generator and for accumulating the energy generated during the hours of a lower absorption by the utilities.

The structure 3 applied to the lower end of the floating body 1 and preventing from upturning is a cylindrical body containing additional service and maintenance plants and devices.

At the base of the bulb-type cylindrical structure 3 there are devices 5 or cables etc. used to transmit the energy to the utilities.

All the magnets 30 and 7 respectively present in the multiple magnet units 17 of the floating cylindrical body 1 and in the disc-type pendulum 6 are made of a magnetic material suitable for achieving high induction levels, such as for instance neodymium, a metal belonging to the "rare earths" group or lanthanides, which is present in the alloy known as misch-metal up to a level of 18%, and obtained by an ion exchange process from the monazite sands, a mineral with a high content of the elements belonging to the lanthanides class, and by electrolysis from it halogenated salts.

The permanent magnets 7 of the disc-type pendulum 6 may be substituted by full round iron rods. In this case, despite unchanged generator operation, the power of the electrical energy generated by induction from the multiple magnet units 17 decreases.

The operation of the mega-generator is possible even with a single coil and a single magnet and without using racks and pinions, or alternatively with two coils and two permanent magnets with a respective central counterweight.

The present invention is shown by reference to a preferred embodiment of the generator, wherein the height of the trestle-like pyramidal structure 2 overhanging the floating body 1 is about 200 meters above sea level (large generator).

Such a height of the trestle structure, and with it of the pendulum supporting rod 6 fitted to the same allows generating, in relation to the diameter of the circular non-magnetic cover plate 12 and under heavy "seagoing" conditions (level 3 on the Douglas scale), a minimum swinging motion of for instance 1° of the floating body 1 and of the disc-type pendulum 6, and achieving a continuity of production of on the average one fifth of the power, through the electromotive forces E generated by 180 multiple coil units excited by the disc-type pendulum 6 moving every second.

On the other hand, under "rough" seagoing conditions (level 5 of the Douglas scale), the intensities due to the reciprocal swings of the floating cylindrical body 1 and disc-type pendulum 6 of for instance 5°, as shown in FIG. 1, add up and occur in all radial directions, thus providing a continuity of production and a maximum of power generation, based on the electromotive forces E generated by an average of 904 multiple coil units excited by the disc-type pendulum 6 moving every second.

By decreasing the height and diameter of the trestle-like pyramidal structure, various generator models can be produced, having various energy production levels depending on the variable conditions of wave action.

The following is mentioned, among other things.

A medium-large size generator, with a trestle-like structure height of 100 meters above sea level and a non-magnetic circular cover plate diameter of 44.5 meter needs, for a minimum swing of a for instance 1° of the floating body and of the disc-type pendulum and an average production continuity of ⅕th of the power, a weak seagoing motion (level 2 of the Douglas scale), while for a continuity of production and maximum power generation it needs a very heavy seagoing motion (level 4 of the Douglas scale), that allows achieving swings of for instance 5°.

A medium-size generator, with a trestle-like structure height of 50 meters above sea level and a non-magnetic circular cover plate diameter of 22 meters needs, for a minimum swing of for instance 1° of the floating body and of the disc-type pendulum and an average continuity of production of ⅕th of the power, a slight seagoing motion. (level 2 of the Douglas scale), while for a continuity of production and maximum power generation it needs a heavy seagoing motion (level 3 of the Douglas scale), that allows achieving swings of for instance 5°.

A small-size generator, with a trestle-like pyramidal structure height of 25 meters above sea level and a non-magnetic circular cover plate diameter of 12 meters starts operating at almost calm seagoing conditions (level 1 of the Douglas scale) and produces, while causing a minimum swing of for instance 1° of the floating body and of the disc-type pendulum, an average continuity of production of ⅕th of the power, while at a low seagoing motion (level 2 of the Douglas scale), the intensities at a reciprocal swinging motion of for instance 5° of the floating body 1 and of the disc-like pendulum 6, which add up and occur in all radial directions, supply a continuity of production and a maximum electrical energy generation.

The generators according to the invention are fitted with on-board computers which may be interconnected to allow a remote control and surveillance of the operations needed for the functioning of the plant.

Other devices are also provided to control the positioning of the plant and of all the means available to technology for the remote surveillance and proper operation of each plant.

I claim:

1. A floating mechanical structure for the direct generation of electricity by the swinging of a magnetic pendulum caused by sea wave motion, constituted of:
    a cylindrical floating body connected to a series of electromagnets, where the cylindrical floating body is subdivided in superimposed sectors mounting eventual devices and means needed for generating, delivering and storing the electrical energy produced, and hermetically sealed so as to behave in a manner similar to that of a floating body, and
    a trestle-like pyramidal structure, from whose top a disc-type pendulum is suspended by appropriate means and fitted with a multiple number of permanent magnets, so as to generate electrical energy through the electromotive forces generated by the reciprocal swings, as a result of wave action, of the electromagnets firmly attached to the plate of the cylindrical floating body with respect to the permanent magnets firmly attached to the disc-type pendulum, characterized by the fact that
    the cylindrical floating body is covered at its top by a non-magnetic circular plate;
    the cylindrical floating body is connected to a series of electromagnets constituted of multiple coil and multiple magnet units formed by permanent magnets with a high coercive force;
    the cylindrical floating body is provided of a bulb-like structure acting as ballast to lower the center of gravity set below the pushing center;
    devices anchor the structure to the sea floor by suitable means such as high traction strength chains or cables, so as to make it impossible for the floating body to shift with respect to the anchoring point;
    means are comprised for transporting the electrical energy generated by the plant; and
    elastic means are comprised to limit the swings of the pendulum.

2. Floating mechanical structure according to claim 1, characterized by the fact that the circular cover plate of the floating body is connected to a series of cylindrical cavities each configured to house a multiple coil unit, which is constituted of a series of coils stacked up and supported by a hollow cylindrical skeleton fitted with appropriate sliding devices for a vertical shifting motion inside the cylindrical cavity, where in its interior the cylindrical skeleton in turn forms a cylindrical cavity equipped with additional sliding devices for a vertical sliding motion of the multiple magnet unit with respect to the skeleton supporting the multiple coil unit.

3. Floating mechanical structure according to claim 1, characterized by the fact that the reciprocal vertical shifting of the electromagnetic units with respect to the multiple coil units is done by racks firmly attached to the multiple magnet groups, racks firmly attached to the multiple coil units and pinions, where the rack and pinion system serves the function of allowing the relative shifting velocity of the induction vector to be doubled with respect to that of the transversal conductors of the coils.

4. Floating mechanical structure according to claim 1, characterized by the fact that prismatic or alternatively cylindrical counterweights made of a non-magnetic material of a high specific weight are interposed between the permanent magnets of each multiple magnet unit, for the purpose of facilitating the vertical downward sliding of the multiple magnet units in question.

5. Floating mechanical structure according to claim 4, characterized by the fact that the counterweights made of a non-magnetic material serve the function of overcoming the force of attraction between the multiple magnet units placed on the cylindrical floating body and the magnets installed on the disc-type pendulum, so as not to obstruct the swings of the pendulum, or at the limit of blocking them.

6. Floating mechanical structure according to claim 1, characterized by the fact that the reciprocal shifting of the multiple magnet units with respect to the multiple coil units generates electromotive forces based on the formula: $E = B \times l \times V$.

7. Floating mechanical structure according to claim 1, characterized by the fact that the electromotive force or the current generated by each multiple coil/multiple magnet unit, picked up at the ends of the circuit formed by each multiple coil unit, is leveled and by appropriate inverters transformed into an alternating current to be used for specific requirements.

8. Floating mechanical structure according to claim 1, characterized by the fact that the picking up of the alternating current generated by each multiple coil/multiple magnet unit is done by suitable brushes sliding on appropriate collectors connected to the ends of each multiple coil unit.

9. Floating mechanical structure according to claim 1, characterized by the fact that the lower surface of the disc-type pendulum is fitted with sensors for actuating the devices applied to the universal joint, which allow, by retracting or releasing the pendulum's supporting rod, to vary the thickness of the magnetic gap between the non-magnetic base of the pendulum and the non-magnetic circular plate of the floating body, so as to keep the pendulum in a safe condition while preventing a dragging action against the series of multiple coil and multiple magnet units mounted at the top of the floating cylindrical body.

10. Floating mechanical structure according to claim 1, characterized by the fact that the cylindrical structure housing the counterweights, or the bulb acting as a ballast of the floating cylindrical body is sized and configured so as to prevent the upturning of the floating cylindrical body under any wind condition (see for instance the Beaufort scale) and seagoing condition (see for example the Douglas scale).

11. Floating mechanical structure according to claim 1, characterized by the fact that along the perimeter of the circular plate of the floating cylindrical body a series of elastic devices are arranged, which serve the function of limiting the swings of the pendulum within the perimeter of the mentioned circular surface.

12. Floating mechanical structure according to claim 1, characterized by the fact that the intensities of the reciprocal swings of the disc-type pendulum and of the cylindrical floating body add up and occur in all radial directions, so as to provide a continuity of production of the electromotive forces.

13. Floating mechanical structure according to claim 1, characterized by the fact that the permanent magnets present in the multiple magnet units of the floating cylindrical body and the magnets of the disc-type pendulum are made of neodymium or of another similar non-magnetic material capable of achieving high induction levels.

14. Floating mechanical structure according to claim 1, characterized by the fact that the magnets of the disc-type pendulum are, in another embodiment of the plant, constituted of a ferromagnetic material.

15. Floating mechanical structure according to claim 1, characterized by the fact that the magnetic induction is carried out by the swings of an inductor over a multiple number of electromagnets constituted of multiple coil units coaxial with the nuclei formed by the magnets that are firmly attached to a floating body, and by the fact that the inductive magnets are inserted in a device swinging in a way such that the wave action can shift it in a multi-directional manner to excite said electromagnets in any position they happen to be in with respect to the swinging inductive device.

16. Floating mechanical structure according to claim 1, characterized by shock absorbers serving as stops for the multiple coil and multiple magnet units, both at the top and at the bottom inside each of the cylindrical cavities.

17. Floating mechanical structure according to claim 1, characterized by devices connected to the chain moorings to allow a lengthening motion capable of compensating the raising and lowering of the floating body with respect to the sea floor, as a result of the changes of the floating level caused by the tides.

* * * * *